(12) United States Patent
Mark et al.

(10) Patent No.: US 6,218,532 B1
(45) Date of Patent: Apr. 17, 2001

(54) HIGH PERFORMANCE BIODEGRADABLE MATERIALS FROM ORIENTED STARCH DERIVATIVES

(75) Inventors: James E. Mark, Cincinnati, OH (US); Brooke Zhao Peterson, San Jose, CA (US); Burak Eman; Ivet Bahar, both of Istanbul (TR); Andrzej Kloczkowski, Rockville, MD (US)

(73) Assignee: The University of Cincinnati, Cincinnati, OH (US)

( * ) Notice: Subject to any disclaimer, the term of this patent is extended or adjusted under 35 U.S.C. 154(b) by 0 days.

(21) Appl. No.: 09/467,275

(22) Filed: Dec. 20, 1999

Related U.S. Application Data

(60) Provisional application No. 60/113,550, filed on Dec. 23, 1998.

(51) Int. Cl.[7] .......................... C07G 17/00; B29C 49/08; D02J 1/06
(52) U.S. Cl. ................. 536/124; 264/178 R; 264/288.4; 264/288.8; 264/340; 106/122; 521/84.1; 521/64
(58) Field of Search ........................ 536/124; 264/178 R, 264/288.4, 288.8, 340; 521/84.1, 64; 106/122

(56) References Cited

U.S. PATENT DOCUMENTS

| | | | | |
|---|---|---|---|---|
| 4,076,663 | * | 2/1978 | Masuda et al. ....................... | 128/285 |
| 5,102,597 | * | 4/1992 | Roe ...................................... | 264/126 |
| 5,336,457 | * | 8/1994 | Wu ....................................... | 264/171 |
| 5,362,777 | * | 11/1994 | Tomka .................................. | 524/47 |
| 5,415,827 | * | 5/1995 | Tomka et al. ......................... | 264/510 |

OTHER PUBLICATIONS

Fakirov et al., *Mechanical properties and transition temperatures of crosslinked–oriented gelatin*, Colloid Polym Sci 275:307–314 (1997).

Fakirov et al., *Mechanical properties and transition temperatures of cross–linked oriented gelatin*, Colloid Polym Sci 274:334–341 (1996).

Zhao et al., *Oriented Gelatin—A New Source for High–Performance Materials*, J.M.S.–Pure Appl. Chem., A33(f), pp. 525–540 (1996).

\* cited by examiner

*Primary Examiner*—Morton Foelak
(74) *Attorney, Agent, or Firm*—Wood, Herron & Evans LLP

(57) ABSTRACT

The present invention involves the synthesis of a series of amylose (starch) derivatives with various degrees of substitution and amylose/amylopectin ratios. These chains are chemically crosslinked and then mechanically deformed (stretched) to produce a biodegradable and mechanically superior material. Specifically, the process consists of chemically modifying starch into starch derivatives such as starch ethers, starch esters and starch carbamates. The polymers have a percentage degree of substitution of from about 35% to about 95% (degree of substitution is from about 1.05 to about 2.85) and preferably have a percentage degree of substitution of from about 65% to about 90% (degree of substitution is from about 1.95 to about 2.70). The starch derivatives are crosslinked to obtain crosslinked chains and processed into sheets, films, fibers, threads or other articles as known in the art. After processing, the articles are swollen in a thermodynamically acceptable solvent or solvent mixture to a desired volume and deformed in a uniaxial or biaxial extension. The polymers materials are preferably stretched from about 1% to about 500% in the direction of stretching. Finally, the solvent is removed, yielding a homogeneous, highly-ordered material. The present invention improves the properties and the quality of sheets, films, fibers, threads or other articles with respect, for example, to mechanical strength. The materials are developed from starch, a natural renewable source which has low cost, high production levels and which replaces petroleum-based, synthetic polymers; the materials acquire high-strength, high-modulus, toughness and flexibility; and the materials exhibit structural and functional stability during processing, storage and use, yet are susceptible to biodegradation upon disposal.

34 Claims, No Drawings

HIGH PERFORMANCE BIODEGRADABLE MATERIALS FROM ORIENTED STARCH DERIVATIVES

This application claims the benefit of U.S. Provisional Application 60/113,550, filed Dec. 23, 1998.

BACKGROUND OF THE INVENTION

A. Field of the Invention

The present invention relates to high-performance biodegradable materials made from substituted, lightly crosslinked starch polymers which have been stretched, a method of producing substituted, lightly crosslinked starch polymers, a method of producing sheets, films, fibers, threads or other articles that consist at least in part of substituted, lightly crosslinked starch polymers, and to sheets, films, fibers, threads or other articles consisting essentially of substituted, lightly crosslinked oriented starch polymers. The materials exhibit structural and functional stability during processing, storage and use, yet are susceptible to microbial and environmental degradation upon disposal.

B. Biodegradable Materials

Synthetic polymers were invented about 60 years ago. Since that time there has been enormous progress in extending their range of applications. These various chemicals have steadily been further developed to show more valuable properties. One characteristic of synthetic polymers is their durability which can also be a disadvantage. The persistence of plastics in the environment, the shortage of landfill space, concerns over emissions during incineration, and entrapment and ingestion hazards from these materials have spurred efforts to develop biodegradable plastics. The challenge in replacing conventional plastics with biodegradable materials is to design such materials that exhibit structural and functional stability during storage and use, yet are susceptible to microbial and environmental degradation upon disposal.

For several decades it has been a goal of industry to make plastic materials either biodegradable by microorganisms or environmentally degradable by sunlight, moisture, temperature and the like. It is a continuing goal to make materials as fully degradable or compostable as possible. A compostable material is one that under-goes chemical, physical, thermal and/or biological degradation such that it may be incorporated into and is physically indistinguishable from finished compost (humus) and which ultimately mineralizes (biodegrades to $CO_2$, water and biomass) in the environment like other known compostable matter such as paper and yard waste. It would be highly desirable to provide a material that is compostable especially in a municipal solid waste composting facility where it may undergo biodegradation in the presence of heat, moisture and microorganisms.

In the search of suitable polymers to replace synthetic polymers, starch is of particular interest since this biopolymer should have no adverse impact on human or environmental health. Furthermore, the introduction of starch as a partial replacement for synthetic polymers will contribute to the preservation of nature resources such as petroleum since starch is a renewable resource.

C. Starch and Starch Related Materials

Starch, a natural polymer $(C_6H_{10}O_5)_n$ derived from plant materials, is commonly found in the form of tiny microscopic granules (5–25 microns in diameter) comprised of stratified layers of starch molecules. Starch occurs naturally in the roots, seeds, and stems of numerous types of plants, including corn, wheat, rice, millet, barley, and potatoes and constitutes the main carbohydrate reserve of plants. Starch consists of two polysaccharides, amylose and amylopectin, which can be separated according to their differences in solubility.

Amylose is a straight chain polymer of several hundred glucose units linked by a-1,4-glycosidic linkages. Amylose is mainly linear in structure, with molecular weight ranging from about 30,000 up to 1 million, although upper limits of 200,000 to 300,000 are more common.

Amylopectin is highly branched through carbon 6 and has a molecular weight of over 1 million. It is believed to consist of chains of 20 to 25 glucose units linked through carbons 1 and 4, as in amylose, but with the chains connected to each other through the 1,6 linkage. There is usually three times as much as amylopectin as amylose in natural starch, although a much higher proportion of either occurs in certain plants.

From the standpoint of chemical structure, starch differs from cellulose in two major ways: the glucose rings are linked together through carbons 1 and 4 by a-rather than b-linkages, and considerable chain branching occurs through carbon 6. But, like cellulose, the complete hydrolysis of starch yields D-glucose.

Starch may be modified chemically by a process known as crosslinking to provide modified properties. Bi- or polyfunctional reagents are used to covalently bridge, or crosslink, two starch molecules at various locations along their chains to provide viscosity stability as well as acid, heat and shear tolerance.

Another chemical modification process of starch is substitution. Here, the introduction of substituent groups on starch by treatment with monofunctional reagents which react with the hydroxyl groups on starch produces starch esters, starch ethers and starch carbamates. Substituents can lower gelatinization temperature, increase viscosity, improve colloidal properties, and modify the hydrophilic or hydrophobic character.

Starch is thermally processible when a plasticizer, such as water, is added to lower its melting temperature ("Tm") below the decomposition temperature. Starch must be combined with other materials (homopolymers or copolymers) in order to produce a satisfactory extruded film because extrusion of starch alone produces a brittle, water-sensitive foam. Addition of polyethylene or polypropylene are known to add water stability, elasticity, and toughness to processed starch-filled films. Unfortunately, polyethylene and polypropylene are compounds which have been shown not to be biodegradable. As a result, only the starch portion of the composite film biodegrades while the remaining copolymers remain intact. In U.S. Pat. No. 5,087,650, Willett et al., issued Mar. 10, 1992, for example, olefins such as ethylene and propylene are copolymerized with co-monomers such as methyl acrylate, ethyl acrylate, and hexyl acrylate to produce a graft copolymer which is then combined with starch. U.S. Pat. No. 4,839,450, Fanta et al., issued Jun. 13, 1989, discloses starch-poly(methyl acrylate) graft copolymers prepared from hot water-soluble modified starches which can be processed to produce moisture-shrinkable films. The starch-based films are prepared from modified starch products such as partially depolymerized starches and derivatized starches, such as starch ethers, that are soluble in hot water. Vinyl and acrylic monomers are then attached to the starch by graft polymerization. U.S Pat. No. 5,322,866, Mayer et al., issued Jun. 21, 1994, discloses a method of preparing and extruding biodegradable starch blends into biodegradable products. Unprocessed raw starch is combined with biodegradable copolymers such as polyvinyl alcohol (PVOH), or ethylene vinyl alcohol (EVOH), a nucleating agent, and a plasticizer. Graft copolymers are not biodegradable, and thus the final product is actually only partially biodegradable due to decomposition of the starch component. Also, production of biodegradable starch-based products with different ratios of starch and copolymer are not easily manufactured. Furthermore, these conventional techniques of producing a starch-based film require additional steps that take extra time and add to the cost of the final articles.

As described in U.S. Pat. No. 4,673,438, Wittwer et al., issued Jun. 16, 1987, and U.S. Pat. Nos. 4,133,784, issued Jan. 9, 1979, 4,337,181, issued Jun. 29, 1982, and 4,454,268, issued Jun. 12, 1984, all to Otey et al., many starch-based biodegradable formulations use starch that has first been "destructurized" or "gelatinized". Destructurization or gelatinization is accomplished by heating the raw starch granules in the presence of water under elevated pressure. This treatment produces a disordering of the starch granules and allows the starch to be more effectively blended in conventional processing and production steps. U.S. Pat. No. 5,422,387, Toms, issued Jun. 6, 1995, discloses liquid impervious, biodegradable films. The films comprise a blend of an interpenetrated network of destructurized starch with ethylene/acrylic acid copolymers or ethylene/vinyl alcohol copolymers, and an aliphatic polyester such as polycaprolactone. However, destructurizing or gelatinizing the starch requires an additional pass through an extruder which increases the time and cost required to make starch-based biodegradable articles.

While many attempts have been made to produce biodegradable films from petroleum and cellulose or starch derived materials, none has been completely successful because either they are too costly or decompose too slowly for most applications. Starch remains the most abundant, low-cost, biodegradable polymer available, and its use in plastic film production could greatly reduce the demand for petrochemicals and the harmful impact on the environment caused by discarding nonbiodegradable plastic films.

D. Mechanically Deformed Starch-Based Materials

Polymer films have been prepared using starch as a component where the films are subsequently stretched in the manufacturing process. However, most of these methods do not utilize stretching to increase mechanical strength but to decrease the integrity of these polymers. Many of these processes rely on a physical weakening of the polymer through mechanical stretching to achieve some degree of biodegradability. For example, U.S. Pat. No. 5,336,457, Wu et al., issued Aug. 9, 1994, discloses compostable polymeric sheets of biodegradable polymers. The composite film is formed by co-extrusion of top and bottom water insoluble thermoplastic films having a water soluble polymer between the top and bottom and stretching the composite substantially uniformly across and through the depth of the composite to weaken the strength of the composite and to increase the overall area of the composite.

U.S. Pat. No. 5,362,777, Tomka et al., issued Nov. 8, 1994, discloses a process for improving the mechanical properties of single- or multi-ply sheets with at least one ply, consisting at least in part of thermoplastically processable starch, the sheets are stretched monoaxially or biaxially after they have been produced. While this patent discloses the process of stretching a starch-based material to increase mechanical strength, the thermoplastically processable starch (or destructurized) consists essentially of a mixture of starch and/or a starch derivative which is melted by heat and mechanical energy. The composition contains at least 5 percent based on weight of at least one additive or plasticizer added, which lowers the melting point of the mix. In addition, the Tomka patent discloses a process which is performed within a temperature range of 150° C. to 300° C. U.S. Pat. No. 5,415,827, also to Tomka et al., issued May 16, 1995, discloses mixing the thermoplastically processable starch with nonbiodegradable polyolefins such as polyethylene or polypropylene before being processed into sheets and stretched. Hence, the final product also consists of nondegradable materials.

SUMMARY OF THE INVENTION

Accordingly, it is an object of the present invention to provide an improved biodegradable material exhibiting high strength which is formed using a cost effective method of manufacture. Compared to most of the existing biodegradable materials (mostly polyesters), the novel starch materials of the present invention do not require the consumption of nature resources such as petroleum.

The present invention involves the synthesis of a series of amylose (starch) derivatives with various degrees of substitution and amylose/amylopectin ratios. These starch chains are chemically cross-linked and then mechanically deformed (stretched) to produce a biodegradable and mechanically superior material.

Specifically, the orientation technique includes the following steps: (a) chemically modifying starch into starch derivatives such as starch ethers, starch esters and starch carbamates; (b) crosslinking the starch derivatives to obtain lightly crosslinked chains; (c) processing the lightly crosslinked polymers into sheets, films, fibers, threads or other articles as known in the art; (d) swelling the articles in a thermodynamically acceptable solvent or solvent mixture to a desired volume; (e) deforming (stretching) the swollen articles, in uniaxial or biaxial extension; and (f) removing the solvent, at constant strain or stress, yielding a homogeneous, highly-ordered material.

An object of this invention is therefore to improve the properties and the quality of sheets, films, fibers, threads or other articles that consist at least in part of crosslinked, substituted starch polymers. In accordance with this invention, these sheets, films, fibers, threads or other articles are stretched monoaxially or biaxially to obtain a significant improvement by means of the stretching procedure with respect, for example, to mechanical strength.

Preferably, the starch utilized should have an amylose content from about 20% to about 80%.

The starch derivatives of the present invention preferably have a percentage degree of substitution of from about 35% to about 95% (degree of substitution is from about 1.05 to about 2.85) and preferably have a percentage degree of substitution of from about 65% to about 90% (degree of substitution is from about 1.95 to about 2.70).

The starch derivative used in the present invention can include mono-, di-, or tri-substituted starch ethers, mono-, di-, or tri-substituted starch esters, and mono-, di-, or tri-substituted starch carbamates.

For use in the present invention, the crosslinking agent is a compound preferably having at least two functional groups reactive with the starch derivative.

The polymer material formed have an extension ratio during drying from about 1% to about 500% in the direction of stretching. Preferably the polymer materials formed should have an extension ratio during drying from about 10% to about 250% in the direction of stretching and is most preferably from about 25% to about 150%.

While the sheets, films, fibers, threads or other articles of the present invention are being produced, they are dried to the point where they are almost moisture-free. In this connection it is advantageous if the starch product is dried or vented during production of the films or fibers so as to reduce the moisture content to <5%.

The present invention has several benefits and advantages. The benefits of the present invention include: (1) the materials are developed from starch, a natural renewable source which has low cost, high production levels and which replaces petroleum-based, nonrenewable materials; (2) the materials acquire high-strength, high-modulus, toughness and flexibility; and (3) the materials exhibit structural and functional stability during processing, storage and use, yet are susceptible to biodegradation upon disposal.

Other objects, features and advantages of the present invention will become apparent from the following detailed description. It should be understood, however, that the detailed description and the specific examples, while indicating preferred embodiments of the invention, are given by way of illustration only, since various changes and modifications within the scope of the invention will become apparent to those skilled in the art from this detailed description.

DETAILED DESCRIPTION OF THE INVENTION

The present invention is directed toward a variety of products which are made of degradable materials. The degradable materials include substituted, lightly crosslinked starch polymers, as those terms are described below.

As used herein, the term "degradable," with reference to the various materials of the present invention refers to a material including a degradable polymer as described below and in the proportions described below. The term "degradable," with reference to the polymer, refers to a polymer having a polymer molecular structure which can decompose to smaller molecules by action of ambient moisture and temperature.

The polymer of the present materials is further characterized as being degradable within a time frame in which products made from the materials, after use, can either be readily recycled by decomposition of the polymer into its monomer units or, if disposed of in the environment, such as in landfills, the polymer degrades quickly enough to avoid significant accumulation of discarded products or wherein the rate of accumulation is significantly less than that of similar products which are not degradable.

The degradation characteristics of the polymer in the present materials depend in large part on the type of material being made with the polymer. Thus, the polymer needs to have suitable degradation characteristics so that when processed and produced into a final material, the material does not undergo significant degradation until after the useful life of the material. Therefore, different embodiments of the present invention will have different degradation characteristics.

The polymer of the present invention can also be used to produce articles which, because the articles require durability in the use for which the article is designed are not degradable under ambient conditions within the time frame of the useful life of the article. As such, in another aspect of the present invention, the polymer can be used to produce such durable articles. Such articles are, nonetheless, considered to be degradable and are particularly useful because they can be treated to accelerate degradation and therefore are degradable upon demand. For example, the polymer can be exposed to environmental conditions which accelerate degradation as, for example, being treated with increased temperature, and/or increased pressure, and/or increased humidity, and/or exposed to suitable catalysts.

In a further embodiment of the present invention, the polymer is biodegradable. "Biodegradable" means that the film or layer is susceptible to enzymatic decomposition, such as by microorganisms, or a compound, portions of which are subject to enzymatic decomposition, such as by microorganisms.

In a further embodiment of the present invention, the polymer is compostable. "Compostable" means that it undergoes chemical, physical, thermal and/or biological degradation such that it may be incorporated into and is physically indistinguishable from finished compost (humus) and which ultimately mineralizes (biodegrades to $CO_2$, water and biomass) in the environment like other known compostable matter such as paper and yard waste. The compostable films and layers of the composite are either biodegradable or environmentally degradable.

"Environmentally degradable" means that the film or layer is capable of being degraded by heat or surrounding environmental elements without microorganisms to a form that ultimately may be biodegradable or mineralizes, i.e., biodegrades to carbon dioxide, water and biomass.

While the macrostructures of the present invention may have a number of shapes and sizes, the structures are typically in the form of sheets, films, fibers, filaments, or other elements as known in the art. The structures will generally have a thickness or diameter between about 0.2 mm and about 5 mm. Preferably, the structures are in the form of a film or sheet. The term "sheet" as used herein describes structures having a thickness greater than about 0.2 mm. The sheets will preferably have a thickness between about 0.5 mm and about 3 mm, typically about 1 mm. The term "film" as used herein describes structures having a thickness from about 0.2 mil to about 250 mil. The sheets will preferably have a thickness between about 0.3 mil and about 100 mil.

"Films and sheets," such as those made in accordance with the invention, are defined as shaped plastics that are comparatively thin in relation to their breadth and width. The films and sheets of the present invention are generally self-supporting and uniform. "Self-supporting films" are those capable of supporting their own weight. "Uniform films" refer to those which are substantially free of breaks, tears, holes, bubbles, and striations.

As used herein, the term "moisture," with reference to the various materials of the present invention refers to water or any other liquid causing wetness or dampness.

The starting point is the production of single- or multi-ply articles where the plies can consist basically almost entirely of substituted starch polymers. In accordance with this invention, it is now proposed that, after these single- or multi-ply articles have been produced, they should be stretched monoaxially or biaxially to obtain a significant improvement by means of the stretching procedure with respect, for example, to mechanical strength.

As described above, the precursor polymers preferably are substituted starch polymer materials that are slightly crosslinked. As recognized in the art, crosslinking serves to render the polymers more water-insoluble. Exemplary processes for network crosslinking the polymers and typical network crosslinking agents are described in greater detail in the U.S. Pat. No. 4,076,663, Edwards et al., issued Feb. 28, 1978.

According to the present invention, high-performance, biodegradable materials are produced by the following steps: (a) chemically modifying starch into starch derivatives such as starch ethers, starch esters and starch carbamates; (b) crosslinking the starch derivatives to obtain lightly crosslinked chains; (c) processing the lightly crosslinked polymers into sheets, films, fibers, threads or other articles as known in the art; (d) swelling the articles in a thermodynamically acceptable solvent or solvent mixture to a desired volume; (e) deforming (stretching) the swollen articles, in uniaxial or biaxial extension; and (f) removing the solvent, at constant strain or stress, yielding a homogeneous, highly-ordered material.

a. Preparation of Substituted Starch Derivatives

The starch-based biodegradable films and fibers of this invention are prepared from any unprocessed raw starch. Furthermore, starches from different sources may be blended to obtain desired physical properties of the end product. Conventional starches are useful having an amylose content from about 0% to about 100%. An amylose content from about 20% to about 80% is preferred. More preferred is an amylose content from about 30% to about 70%.

The raw starch starting material is available from a wide variety of sources such as corn starch, potato starch, sweet potato starch, wheat starch, cassava starch, rice starch, sago starch, tapioca starch, sorghum starch, legume starch, arrowroot starch, bracken starch, Indian lotus starch, water chestnut starch, Amylomaize V, Amylomaize VII, etc.

To overcome the drawbacks of using pure starch, starch derivatives, e.g., starch ethers, starch esters, and starch carbamates, must be synthesized. These starch derivatives acquire increased hydrophobicity compared to starch, which enables them to maintain performance during processing, storage, and use. The degree of hydrophobicity of the starch derivatives will vary depending upon the nature of the substitution groups and the degree of substitution. The substitution group may be hydrophobic or hydrophilic. Alternatively, the starch polymer may contain both hydrophilic and hydrophobic substitution groups. The actual starch derivative to be used will vary depending upon the characteristics of the final polymer material desired. For example, some materials will contain starch derivatives of greater hydrophobicity for producing articles of greater water resistance during use. The existence of free hydroxyl groups on the starch-ether backbones (due to incomplete substitution) will allow these materials to interact with water and enzymes to initiate biodegradation upon disposal. The starch may be modified by substitution groups which may include, for example, ethers (—OR), esters (—C(O)—OR), and carbamoyl ($H_2N$—CO—) groups.

In general, the R group of the ether and ester substituents for the starch polymers may be hydrophobic or hydrophilic and is preferably an organic group. The organic groups can separately and independently be, for example, an alkyl chain, an aralkyl group, an aryl group, or a steroid group. An alkyl chain can be chosen of any desired size, depending on the hydrophobicity desired. A preferred range of alkyl chains is from 1 to 24 carbon atoms.

The starch derivative may be a mono-, di-, or tri-substituted starch ether (e.g., 2,3,6-trimethylamylose, 2,3,6-triethylstarch ether, 2,3,6-trihexylstarch ether, 2,3,6-tri(ethyl-allyl)starch ether, and 3-amino-3-oxypropyl starch ether); a mono-, di-, or tri-substituted starch ester (e.g., starch triacetate, starch tributanoate, starch triphosphate, etc.), or a mono-, di-, or tri-substituted starch carbamate (e.g., starch tri(3,5-dimethylphenylcarbamate, starch trihexylcarbamate, etc.). Preferably, the starch is substituted with an ether group. More preferably, the starch is mono-, di-, or tri-substituted with an ether group where R is an alkyl chain from 1 to 24 carbon atoms. Most preferably, triethylsarch ethers are used as the starting material.

It is contemplated that one of skill in the art will be able to prepare various ethers, esters and carbamates, including those listed above, without undue experimentation given the readily-available starting materials and in light of the synthetic methodology disclosed in the present application and prior art. Many of the components are commercially available, for example, from Sigma Chemicals.

The starch starting material must be crosslinkable. Preferably, they are incompletely substituted and thus have residual hydroxyl groups available for crosslinking. Alternatively, the substitution groups may possess potential crosslink sites (e.g., allyl, amino, and hydroxylalkyl groups) so that the starch chains can be lightly crosslinked.

The degree of substitution for alkylation of the starch can be estimated by integrating the proton NMR spectrum of the methine proton peaks on the C-4 carbon. The degree of substitution (DS) is calculated as:

$$DS = 3 \times [\text{Area}_{amylose\ C\text{-}4\ proton} / (\text{Area}_{amylose\ C\text{-}4\ proton} + \text{Area}_{trialkylamylose\ C\text{-}4\ proton})].$$

Since there are only three free hydroxyl groups on each glucose unit of the starch backbone, the maximum DS is 3. The percentage degree of substitution is expressed as:

$$\%DS = 100 \times DS/3.$$

Typically, the substituted starch polymers of the present invention have a percentage degree of substitution of from about 35% to about 95% (DS is from about 1.05 to about 2.85). Preferably, the substitution percentage is from about 65% to about 90% (DS is from about 1.95 to about 2.70).

The presence of moisture in the substituted starch polymers may consume the crosslinking agent. In this connection it is advantageous if the starting material is dried or vented before crosslinking so as to reduce the moisture content to less than 5%. Preferably, the moisture content is less than 1%.

b. Crosslinking of Substituted Starch Derivatives

The next step consists of crosslinking the starch derivatives to obtain lightly crosslinked, substituted starch polymer chains, either by chemical reagents or high-energy radiation. This can be done either in the presence of solvent, or the solvent can be introduced subsequently, by swelling.

Other crosslinking methods are described in detail in the U.S. Pat. No. 5,102,597, Roe et al., issued Apr. 7, 1992, and in U.S. Pat. No. 4,076,663, the disclosures of which are incorporated herein by reference in their entirety. The substituted starch polymers are joined together by crosslinking agents, which are sufficient to react with the polymer material to form crosslink bonds between the starch polymer chains.

For example, for the preferred substituted starch polymer materials possessing hydroxyl or other crosslink sites, it is believed that the crosslinking agent reacts with the hydroxyl sites of the starch backbone or other crosslink sites of the starch substitution groups to form covalent chemical crosslink bonds between the chains of different precursor starch segments. These covalent chemical crosslink bonds generally arise as a result of the formation of bonds, such as ester, ether, carbamate, urethane, etc., by reaction of the functional groups of the crosslinking agents with the hydroxyl or other crosslink sites of the substituted starch polymer material.

Crosslinking agents useful in the present invention are those that react with the polymer material to form the crosslinked gels and can be any difunctional reagent which can provide crosslinked reaction products. Such crosslinking agents include compounds having at least two functional groups reactive with the starch derivative. Typically, the crosslinking agents are those compounds having at least two functional groups reactive with the starch derivative include di- or poly-functional compounds which contain groups reactive with carboxyl, carboxylic acid anhydride, hydroxyl, amino or amide groups. Specific crosslinking agents useful in the present invention are described in more detail in U.S. Pat. No. 4,076,663.

The crosslinking agent is preferably one or more compounds selected from the group consisting of diisocyanates, aliphatic acid chlorides, hydridosilanes, and silanol-terminated oligosilanes. More preferably, the crosslinking agent is hexamethylene diisocyanate, silanol terminated polydimethylsiloxane or $\alpha,\omega$-dihydrido-oligo (dimethylsiloxane). Most preferably, the crosslinking agent is hexamethylene diisocyanate. One crosslinking agent or two or more substantially mutually nonreactive crosslinking agents selected from the group mentioned above may be used.

As used herein, the term "lightly crosslinked," with reference to the various materials of the present invention refers to the density of crosslinking between polymer chains. The crosslinking density is determined by the number of crosslinks per starch derivative chain. In general, there is one crosslink for every 25 to 250 glucopyranose units. Preferably, there is one crosslink for every 100 to 150 glucopyranose units. However, the actual amount of a crosslinking to be used will vary depending upon the kind of substitution groups, the degree of substitution and the desired properties of the final article. In the present invention, other materials or agents can be used with the crosslinking agent(s) as an aid in producing the crosslinked polymer aggregates, or in promoting or assisting in the reaction of the crosslinking agent with the polymer material, or as solvents.

A crosslinking solvent may also be used in conjunction with the crosslinking agent. A "crosslinking solvent" as used in this application, refers to the solvent used in the crosslinking step. These crosslinking solvents are used to promote uniform dispersion of the crosslinking agent. Crosslinking solvents useful in the present invention are typically organic solvents such as chloroform, toluene, benzene, dimethylsulfoxide, dimethylformamide, etc. However, other solvents capable of dissolving the starch derivatives, well known to those skilled in the art, can be used. Preferred crosslinking solvents are chloroform, toluene, benzene or mixtures thereof. Typically the crosslinking solvent comprises a mixture including an crosslinking agent such that the step of applying an crosslinking agent is carried out simultaneously with the step of applying a crosslinking solvent.

The actual amount of solvent to be used will vary depending upon the kind of substitution groups, the degree of substitution, and the degree of crosslinking of polymer material. The crosslinking agent may also be used in a mixture with one or more solvents. Other optional components may also be mixed with the solution containing the crosslinking agent.

The crosslinking reaction can be promoted by adding a catalyst to the crosslinking agent to reduce the time and/or the temperature and/or the amount of crosslinking agent required to join the precursor polymer chains together. The actual time and temperatures used will vary depending upon the specific polymer materials used for the precursor polymer chains, the specific crosslinking agents used, the presence or absence of an additive in the reaction step, and the thickness or diameter of the macrostructure.

The crosslinking solvent may be applied to the precursor chains by any of various techniques and apparatus used for applying solutions to materials including coating, pouring, spraying, atomizing, or immersing the solvent on the precursor chains. The crosslinking solvent can be mixed with the precursor polymer chains by any of a number of mixing techniques and mixing apparatus to insure that the precursor chains are thoroughly coated with the crosslinking solvent.

This crosslinking reaction can occur at ambient room temperatures. Crosslinking is typically carried out at a temperature of from about 18° C. to about 90° C. for from about 12 to about 48 hours, preferably from about 18° C. to about 50° C. for from about 24 to 48 hours. The crosslinking reaction can be carried out at elevated temperatures to speed up the reaction.

The reaction between the crosslinking agent and the polymer material may alternatively be activated, instead of a spontaneous reaction, to form the crosslink bonds between different substituted starch chains. The method for activating and completing the reaction depends on the type of precursor material used and the composition of the crosslinking agent and any optional components. In general, the reaction may be caused by irradiation (e.g., ultraviolet, gamma- or X-radiation), by a catalyst which functions as an initiator, by an activator, or by thermal activation (heating) using any of a number of different apparatus as are known including the various ovens or dryers as are known. When radiation is used to activate the crosslinking reaction, the starch derivative itself may contain a side group with a double bond capable of forming crosslinks with other starch chains. Radiation polymerization methods as are known in the art are suitable for use herein.

The method of producing the crosslinked polymer comprises the steps of providing precursor starch derivative chains of the type herein described, applying a crosslinking agent to a portion of the polymers, and reacting the crosslinking agent with the polymer material to form crosslink bonds between the polymer chains of different precursor polymer chains.

In an alternative embodiment of the present invention, after the crosslinking agent is applied onto the precursor substituted starch chains, the crosslinking agent is mixed with the precursor starch derivative by any of a number of mixing techniques to insure that the precursor substituted starch chains are thoroughly mixed with the crosslinking agent to thereby enhance the efficiency of the crosslink bonds between the precursor chains. The mixing can be accomplished using various techniques and apparatus, including various mixers or kneaders, as are known in the art.

In an alternative embodiment of the present invention, a mixture of starch derivative chains, a crosslinking agent, and a crosslinking solvent are mixed and extruded in a conventional extruder apparatus to feed a pair of driven compacting rolls having a fixed (but variable) gap between the rolls so as to compress the aggregate into the form of a film or fiber. The film or fiber is then processed to specific lengths to provide macrostructures that have a specifically designed size, shape, and/or density. Such a method is described in detail in the U.S. Pat. No. 5,102,597.

While the substituted starch polymer composition of the present invention is essentially composed of a substituted starch-based macromolecular substance, it may contain as necessary a variety of additives such as natural polymers other than those related to starch (polysaccharide type polymers, cellulose polymers, proteinaceous polymers, etc.), heat stabilizers, colorants, flame retardants, ultraviolet absorbers, fungicides, herbicides, antioxidants, etc.

The crosslinked, substituted starch polymers are then dried or vented before crosslinking so as to reduce the moisture content to less than 5%. Preferably, the moisture content is less than 1%.

c. Processing Polymers into Articles

In the process proposed by the invention, it is proposed to produce single- or multi-ply sheets, films, fibers, threads or other articles as known in the art with at least one ply containing cross-linked, starch derivative polymers. The dried, crosslinked materials formed are hard and brittle.

The biodegradable films of the present invention may be processed using many of the conventional procedures for producing films or fibers of polymers on film or fiber making equipment.

In accordance with th e present invention, a layer composed of a substituted starch polymer substance can be laminated with a layer composed of a different substrate material. The different material may, for example, be paper, woven cloth, nonwoven cloth or wood board.

For laminating a layer comprised of the above composition with a layer comprised of said different material, any of the known methods such as dry lamination, extrusion, co-injection, multi-layer extrusion, etc. can be variously employed. In manufacturing such a laminate, an adhesive can be employed with advantage.

d. Swelling of the Polymer Structures

Before the polymers can be oriented, the articles are swollen in a thermodynamically acceptable swelling solvent or solvent mixture to a desired swollen volume. A "swelling solvent" as used in this application, refers to the solvent used in the swelling step. These swelling solvents are used to prepare a gel state in the articles which is capable of undergoing large mechanical deformation. Swelling solvents useful in the present invention are typically organic solvents such as chloroform, toluene, benzene, etc. However, other solvents capable of swelling the starch derivative polymers can be used. Preferred swelling solvents are chloroform, toluene, benzene or mixtures thereof. The actual amount of swelling solvent to be used will vary depending upon the kind of polymer material.

e. Orientation of the Polymer Structures

The swollen networks are then stretched, in uniaxial or biaxial extension, to induce segmental orientation. Orientation refers to stretching a film or fiber in at least one direction which allows for alignment and ordering of the polymer molecules along the direction of stretching.

Orienting can be uniaxial, which is typically in the direction the film or fiber travels as it is processed. Alternately, orienting can be biaxial which is typically in the direction the film or fiber travels as it is processed and in a second direction transverse to the first.

The films are preferably oriented at a polymer concentration from about 10 volume percent to about 70 volume percent. The films are more preferably oriented at a polymer concentration from about 15 volume percent to about 30 volume percent. The films are most preferably oriented at a polymer concentration from about 20 volume percent to about 25 volume percent.

Orientation is generally performed within a temperature range of from about 18° C. to about 90° C. Preferably, the stretching is performed within a temperature range of from about 20° C. to about 50° C.

The extension ratio during drying can be from about 1% to about 500% in the direction of stretching. The preferred stretching amount is in the range from about 10% to about 250% in the direction of stretching. The most preferred amount being in the range of from about 25% to about 150% in the direction of stretching.

f. Solvent Removal

Finally, the swelling solvent is removed at essentially the same, substantially deformed state, yielding a homogeneous and highly-ordered material. The finished starch derivative product is preferably dried or vented during production so as to reduce the final moisture content to less than 5%. Preferably, the final moisture content is less than 1%. Most preferably, the final polymers should be dried to the point where they are almost solvent or moisture-free.

The oriented films or fibers may be dried by allowing the solvent to evaporate under ambient conditions. The rate of the evaporation should be kept low to prevent inhomogeneous shrinkage in the direction perpendicular to the stretching. The orientation direction of the film or fiber is kept at constant length. Usually several days are required to obtain a dried film with homogeneous density.

Alternatively, the films or fibers may be dried using a coagulation process. Such coagulation processes are widely used in industry to obtain films or fibers for the polymer solutions, for example in "wet spinning". Gel formation by coagulation depends upon the differential solubility of polymers in a blend of solvents and nonsolvent, and the solubility changes resulting from concentration changes of added chemicals. For example, solvents A and B may be a good solvent and a poor solvent (or nonsolvent), respectively, for polymer Y. A nonsolvent is a solvent in which the polymer neither dissolves nor swells. A polymer solution of Y is prepared in solvent A and extruded into a bath of solvent mixture of A and B. The concentration difference causes diffusion of A into the bath and the B into the polymer solution. As the concentration of B increases and that of A decreases, the polymer becomes less soluble and yields eventually the desired unswollen film. Changes in pH or supersaturated solutions may also be sufficient to reverse the solubility or change the chemical nature of a polymer in solution, transforming it into an insoluble, stable gel.

For example, for films swollen in chloroform, a nonsolvent with good miscibility with chloroform is required. Petroleum ether can then be employed because of its low cost, low boiling point, and bulk availability, its miscibility with chloroform and because it is a thermodynamically poor solvent for triethylamylose. Other methods of drying the films or fibers may be employed as known to those skilled in the art.

The following examples illustrate and explain the present invention but are not to be taken as limiting the present invention in any regard.

EXAMPLES

Example 1 a. Preparation of Starch Derivative

Methyisulfinylmethylcarbanion (MSMC) is prepared using 6.67 g NaH (as 60% suspension in mineral oil) and washed four times, with 100 mL dry pentane each time. The pentane is decanted and the residue drawn off by vacuum. To the dry, powdery NaH, 75 mL of DMSO is added under argon and the mixture is stirred at 65–70° C. for two hours or until the hydrogen evolution ceases. The reddish black methylsulfinylmethylcarbanion is cooled to room temperature and is used for alkylation.

A solution of 5 g amylomaize VII (70% amylose/30% amylopectin) in 250 mL DMSO is mixed with MSMC under argon. The mixture solidifies to a greenish gray gel instantly and it becomes liquid again after being stirred vigorously for 5–10 minutes. After continuous stirring for two more hours, 15 mL of iodomethane is added at 20° C. in two hours. The solution first becomes greenish and then it turns to dark yellow and after complete addition of iodomethane, it then turns to a light yellow. The mixture is stirred continually for 16–18 more hours before being poured into 0.5 L of ice water. The triethylamylose is separated out as a white or pale yellow precipitate. The crude product is then washed several times with a sodium bisulfide solution to remove trace amounts of iodoethane. Purification is carried out by precipitating the triethylamylose toluene solution from petroleum ether. The triethylamylose prepared from amylomaize VII has a degree of substitution ranging from 65 to 90%.

b. Crosslinking and Production of Films

The highly-substituted triethylamylose is then partially crosslinked with hexamethylene diisocyanate. Two grams of the highly-substituted triethylamylose is dissolved in 10 mL of dry toluene. An appropriate amount of hexamethylene diisocyanate is added via a syringe, followed by a catalytic amount of triethylamine. The mixture is stirred for about 3–4 hours before being transferred into a round TEFLON® pan (diameter of 2 inches). The gelation is completed in the pan overnight at 40–50° C., and solvent is almost gone by then. A brittle film is obtained after the solvent is evaporated, and it does not dissolve in common organic solvents.

c. Orientation

The cross-linked amylose (starch) ether films are swollen to about 4–5 times their original volume in chloroform. The swollen films are then uniaxially deformed to a desired extension by moving two clamps at both ends. The specimens are stretched to about 150% of their original lengths. The stretched films are dried at constant length first under ambient conditions for 1–2 days followed by further drying in vacuo at 50° C. for an additional day. The resulting films are stored in a desiccator.

After orientation the triethyl amylose films become tougher. The tensile strength and modulus of dried samples having dimensions of 50 mm$^3$×5 mm$^3$×0.5 mm$^3$ are measured using an Instron mechanical tester (Model 1122). The cross-head speed is 0.1 in/min with the initial gauge length of 0.7 inch. The force and deformation are recorded with an x-y recorder.

The tensile strengths and moduli increase monotonically with an increase of extension ratio during drying. A 3.5-fold increase in tensile strength, and a 30% increase in tensile modulus (in comparison to the cross-linked unoriented films) is observed at an extension ratio of 135%. The oriented films show a 20-fold increase in elongation at break and a 100-fold increase in toughness with an extension ratio of 135%.

Example 2

Similar to Example 1 except that the film is dried using a coagulation process. A polymer solution of crosslinked amylose (starch) ether is prepared in chloroform and extruded into a bath of solvent mixture of chloroform and petroleum ether. The concentration difference causes diffusion of chloroform into the bath and the petroleum ether into the polymer solution. As the concentration of petroleum ether increases and that of chloroform decreases, the polymer becomes less soluble and yields eventually the unswollen, crosslinked amylose (starch) ether film.

Example 3

Similar to Example 1 except that the crosslinked amylose (starch) ether polymer is processed to make a fiber.

Example 4

Similar to Example 1 except that tri(ethyl-allyl)amylose is used as the starch derivative.

Example 5

Similar to Example 1 except that the crosslinking agent used is a hydridosilane. The desired amount of α,ω-dihydrido-oligo(dimethylsiloxane) with hydride terminal groups (M.W. 400) is added to the starch derivative dissolved in toluene. Then 1 wt. % dibutyltin dilaurate is added.

Example 6

Similar to Example 1 except that biaxial orientation is performed by stretching the swollen polymer film simultaneously in two directions with the same extension ratio to about 50% of their original lengths. The stretched films are dried at constant length first under ambient conditions for 1–2 days followed by further drying in vacuo at 50° C. for an additional day. The resulting films are stored in a desiccator.

The present invention improves the properties and the quality of sheets, films, fibers, threads or other articles that consist at least in part of lightly crosslinked, substituted starch polymers. The materials are developed from starch, a natural renewable source, the materials acquire high-strength, high-modulus, toughness and flexibility and the materials exhibit structural and functional stability during processing, storage and use, yet are susceptible to biodegradation upon disposal.

What is claimed is:

1. A method for synthesizing polymers comprising the steps of:
    (a) chemically modifying starch into starch derivatives;
    (b) crosslinking the starch derivatives to obtain lightly crosslinked chains;
    (c) processing the lightly crosslinked polymers into sheets, films, fibers, threads or other articles as known in the art;
    (d) swelling the articles in a thermodynamically acceptable solvent or solvent mixture to a desired volume;

(e) deforming (stretching) the swollen articles, in uniaxial or biaxial extension; and (f) removing the solvent, at constant strain or stress.

2. The method of claim 1, wherein the starch has an amylose content from about 20% to about 80%.

3. The method of claim 1, wherein the substituted starch polymers of the present invention have a percentage degree of substitution of from about 35% to about 95% (DS is from about 1.05 to about 2.85).

4. The method of claim 1, wherein the substituted starch polymers of the present invention have a percentage degree of substitution of from about 65% to about 90% (DS is from about 1.95 to about 2.70).

5. The method of claim 1, wherein the starch derivative is selected from the group consisting of mono-, di-, or tri-substituted starch ethers, mono-, di-, or tri-substituted starch esters, and mono-, di-, or tri-substituted starch carbamates.

6. The method of claim 1, wherein the starch derivative is triethylstarch ether.

7. The method of claim 1, wherein the crosslinking agent a compound having at least two functional groups reactive with the starch derivative.

8. The method of claim 1, wherein the crosslinking agent is a di- or poly-functional compound which contains groups reactive with carboxyl, carboxylic acid anhydride, hydroxyl, amino or amide groups.

9. The method of claim 1, wherein the crosslinking agent is selected from the group consisting of diisocyanates, aliphatic acid chlorides, hydridosilanes, and silanol-terminated oligosilanes.

10. The method of claim 1, wherein the crosslinking agent is hexamethylene diisocyanate.

11. The method of claim 1, wherein the number of crosslinks per starch derivative chain is about one crosslink for every 25 to 250 glucopyranose units.

12. The method of claim 1, wherein the number of crosslinks per starch derivative chain is about one crosslink for every 100 to 150 glucopyranose units.

13. The method of claim 1, wherein polymer articles are oriented at a polymer concentration from about 10 volume percent to about 70 volume percent.

14. The method of claim 1, wherein polymer articles are oriented at a polymer concentration from about 15 volume percent to about 30 volume percent.

15. The method of claim 1, wherein the extension ratio is from about 1% to about 500% in the direction of stretching.

16. The method of claim 1, wherein the extension ratio is from about 10% to about 250% in the direction of stretching.

17. The method of claim 1, wherein the extension ratio is from about 25% to about 150% in the direction of stretching.

18. The method of claim 1, wherein the polymer compositions are dried using a coagulation process.

19. The composition produced by the method of claim 1.

20. The composition of claim 19, wherein the starch has an amylose content from about 20% to about 80%.

21. The composition of claim 19, wherein the substituted starch polymers of the present invention have a percentage degree of substitution of from about 35% to about 95% (DS is from about 1.05 to about 2.85).

22. The composition of claim 19, wherein the substituted starch polymers of the present invention have a percentage degree of substitution of from about 65% to about 90% (DS is from about 1.95 to about 2.70).

23. The composition of claim 19, wherein the starch derivative is selected from the group consisting of mono-, di-, or tri-substituted starch ethers, mono-, di-, or tri-substituted starch esters, and mono-, di-, or tri-substituted starch carbamates.

24. The composition of claim 19, wherein the starch derivative is triethyl-starch ether.

25. The composition of claim 19, wherein the crosslinking agent a compound having at least two functional groups reactive with the starch derivative.

26. The composition of claim 19, wherein the crosslinking agent is a di- or poly-functional compound which contains groups reactive with carboxyl, carboxylic acid anhydride, hydroxyl, amino or amide groups.

27. The composition of claim 19, wherein the crosslinking agent is selected from the group consisting of diisocyanates, aliphatic acid chlorides, hydridosilanes, and silanol-terminated oligosilanes.

28. The composition of claim 19, wherein the crosslinking agent is hexamethylene diisocyanate.

29. The composition of claim 19, wherein polymer articles are oriented at a polymer concentration from about 10 volume percent to about 70 volume percent.

30. The composition of claim 19, wherein polymer articles are oriented at a polymer concentration from about 15 volume percent to about 30 volume percent.

31. The composition of claim 19, wherein the extension ratio is from about 1% to about 500% in the direction of stretching.

32. The composition of claim 19, wherein the extension ratio is from about 10% to about 250% in the direction of stretching.

33. The composition of claim 19, wherein the extension ratio is from about 25% to about 150% in the direction of stretching.

34. The composition of claim 19, wherein the polymer compositions are dried using a coagulation process.

* * * * *